(12) United States Patent
Uchida et al.

(10) Patent No.: US 8,596,582 B2
(45) Date of Patent: Dec. 3, 2013

(54) AIRCRAFT CONTROL SURFACE OPERATING DEVICE

(75) Inventors: Minoru Uchida, Tokyo (JP); Hiroshi Yamanouchi, Oak Ridge, NC (US)

(73) Assignee: Honda Patents & Technologies North America, LLC, Torrance, CA (US)

( * ) Notice: Subject to any disclaimer, the term of this patent is extended or adjusted under 35 U.S.C. 154(b) by 73 days.

(21) Appl. No.: 13/275,676

(22) Filed: Oct. 18, 2011

(65) Prior Publication Data

US 2012/0091283 A1    Apr. 19, 2012

Related U.S. Application Data

(60) Provisional application No. 61/394,263, filed on Oct. 18, 2010.

(51) Int. Cl.
*B64C 9/00*      (2006.01)
(52) U.S. Cl.
USPC .......................................... 244/213; 244/214
(58) Field of Classification Search
USPC ......... 244/213, 76 A, 130, 123.1, 102 R, 217, 244/214, 99.3
See application file for complete search history.

(56) References Cited

U.S. PATENT DOCUMENTS

| | | | | |
|---|---|---|---|---|
| 3,874,617 A | * | 4/1975 | Johnson | 244/216 |
| 4,159,089 A | * | 6/1979 | Cole | 244/214 |
| 4,542,869 A | * | 9/1985 | Brine | 244/216 |
| 4,784,355 A | | 11/1988 | Brine | |
| 5,836,550 A | * | 11/1998 | Paez | 244/214 |
| 6,464,176 B2 | * | 10/2002 | Uchida et al. | 244/216 |
| 7,429,054 B1 | * | 9/2008 | Turner | 280/124.128 |
| 7,546,984 B2 | * | 6/2009 | Poppe et al. | 244/215 |
| 2006/0071441 A1 | * | 4/2006 | Mathis | 280/124.128 |
| 2006/0226296 A1 | * | 10/2006 | Perez-Sanchez | 244/215 |
| 2007/0292062 A1 | * | 12/2007 | Arnold et al. | 384/206 |
| 2008/0128548 A1 | * | 6/2008 | Simkulet | 244/87 |
| 2009/0134281 A1 | * | 5/2009 | Engelbrecht et al. | 244/215 |
| 2011/0236877 A1 | * | 9/2011 | Yao et al. | 435/4 |

OTHER PUBLICATIONS

International Search Report and Written Opinion of PCT/US2011/056692 dated Mar. 1, 2012.

* cited by examiner

*Primary Examiner* — Christopher P Ellis
*Assistant Examiner* — Medhat Badawi
(74) *Attorney, Agent, or Firm* — Rankin Hill & Clark LLP

(57) ABSTRACT

An aircraft control surface operating device is provided for operating a control surface on an aircraft body portion to move between a retracted position and an extended position. The aircraft control surface operating device includes a control surface mounting assembly which movably secures the control surface to the aircraft body portion, a drive arm rotatable about a drive axis relative to the aircraft body portion, an actuator for rotating the drive, and a drive link connecting the drive arm to the control surface mounting assembly. The drive link has a control end connected to the control surface mounting assembly and a driven end connected to the drive arm via a drive bearing joint. The drive link connects the drive arm and the control surface mounting assembly such that rotation of the drive arm is causes extending or retracting movement of the control surface.

7 Claims, 11 Drawing Sheets

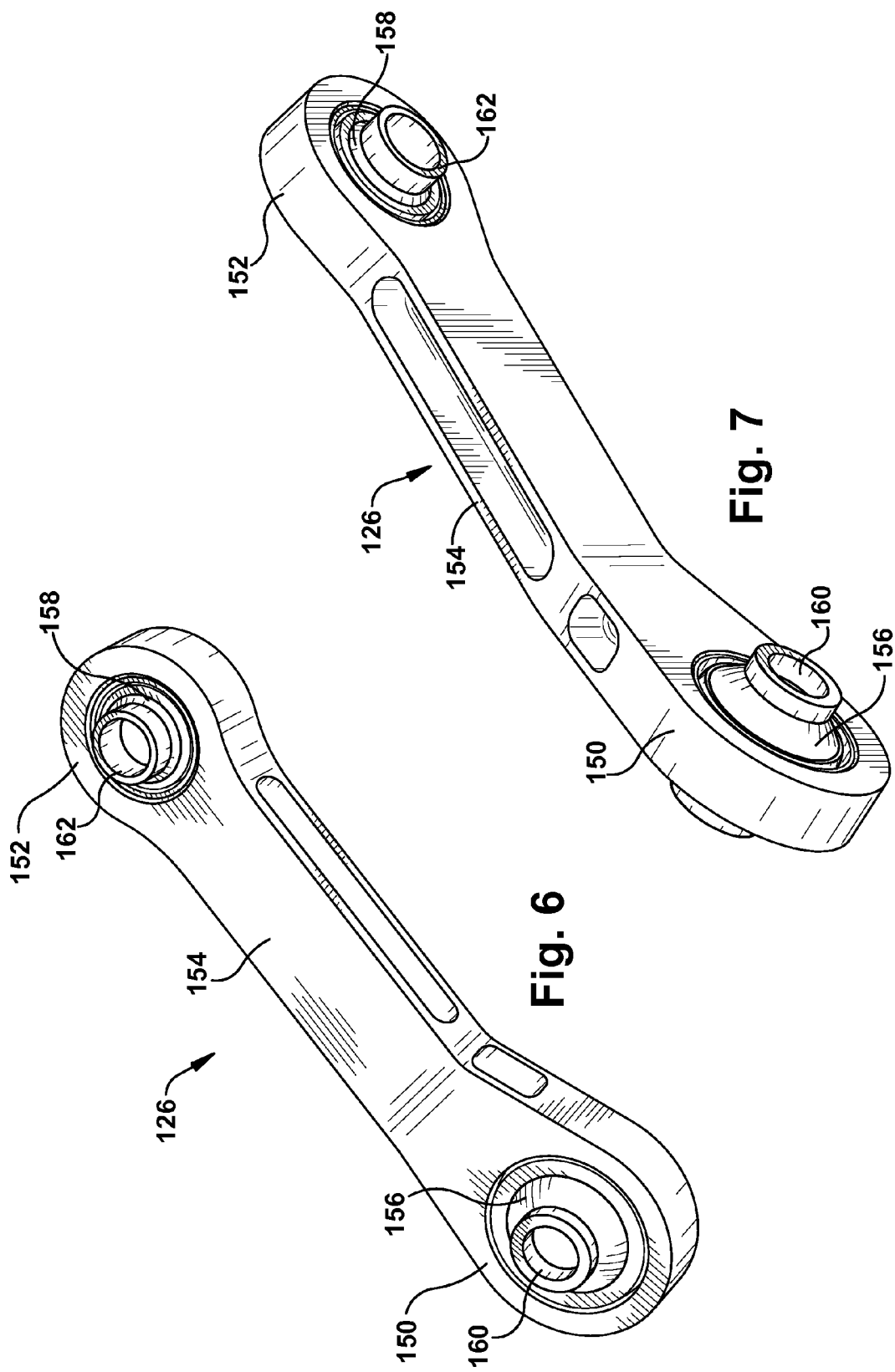

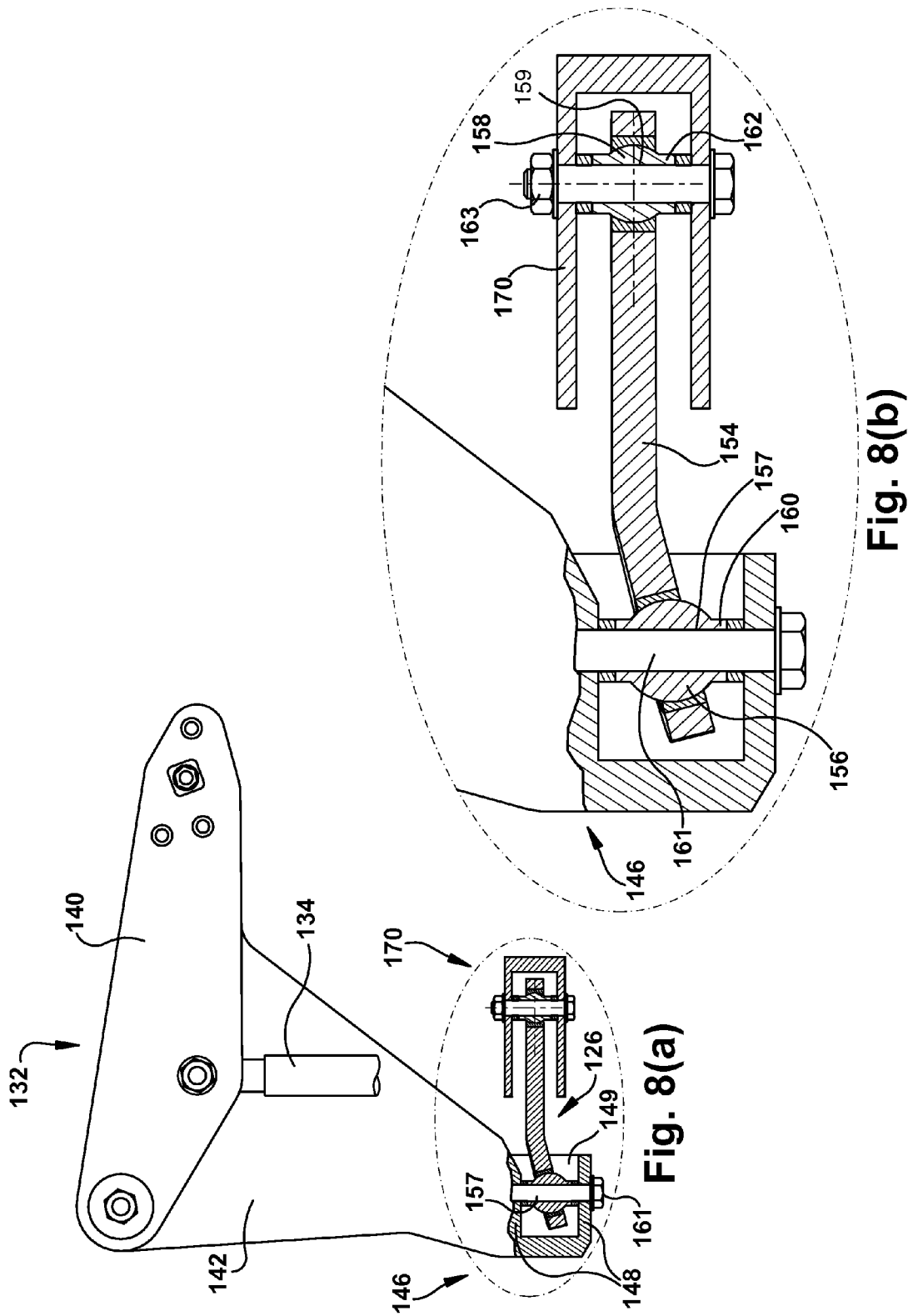

AIRCRAFT CONTROL SURFACE OPERATING DEVICE

This application claims the benefit of U.S. provisional patent application Ser. No. 61/394,263, filed Oct. 18, 2010, which is incorporated by reference in its entirety herein.

BACKGROUND

The present disclosure generally relates to an aircraft control surface operating device, and more particularly relates to an aircraft control surface operating device which incorporates at least one bearing joint.

Aircrafts may be provided with control surfaces which are operable to modify an aerodynamic profile of the aircraft. Generally, the control surfaces may be provided on any portion of an aircraft body and are movable between different positions, each of which modify the aerodynamic profile of the aircraft in a particular manner. The modified aerodynamic profile provided by the control surfaces may be used to facilitate desired aircraft maneuvers, such as taking-off, landing, ascending, descending, turning, etc.

One example of an aircraft control surface used in a winged aircraft is a wing flap. Wing flaps may be hinged surfaces provided on a trailing edge of aircraft wings. The wing flaps may be extended and retracted to modify the aerodynamic profile of the aircraft in a desired manner. Particularly, extending the flaps increases a camber of the aircraft wings, and therefore raises a maximum lift coefficient. The increase in the maximum lift coefficient allows the aircraft to generate a necessary/desired lift while flying at a lower speed, thereby reducing a stalling speed of the aircraft. Accordingly, the aircraft may safely fly at lower speeds, such as may be required during take-off and landing. Extending the wing flaps also increases drag on the aircraft, which can be beneficial during landing and approach for landing as the drag helps to slow down the aircraft. Conversely, during flight it may be desirable to reduce drag on the aircraft to allow for increased aircraft speed. As such, the wing flaps may be retracted during flight.

The control surfaces may be controlled by operating devices which move the control surfaces between the possible positions. For example, in an exemplary wing flap, a wing flap operating device may be provided to move the wing flap between the extended and retracted positions. The operating device(s) may be connected to and controlled by a pilot control system within the aircraft, such as in the aircraft cockpit. A control surface operating device is described in U.S. Pat. No. 6,464,176, the contents of which are hereby incorporated in full by reference.

As aircrafts may travel at high speeds during flight, it is to be appreciated that the control surfaces may be subjected to significant forces caused by the airflow contacting the control surfaces (as well as other forces, such as gravity, etc.). As the control surface operating devices may be connected to the associated control surfaces, the operating devices may similarly be subjected to these forces. Accordingly, the operating devices may benefit from a configuration suited to handle these forces. Additionally, the operating devices may be bulky or require redesign of other aircraft components, often to the detriment of another aircraft feature. As such, a compact control surface operating device may be beneficial.

SUMMARY

According to one aspect, an aircraft control surface operating device is provided for operating a control surface on an aircraft body portion to move between a retracted position and at least one extended position. The aircraft control surface operating device includes a control surface mounting assembly, a drive arm, an actuator, and a drive link. The control surface mounting assembly is configured to movably secure the control surface to the aircraft body portion. The drive arm is rotatably mounted to an aircraft body portion so as to be rotatable about a drive axis relative to said aircraft body portion. The actuator is configured to rotate the drive arm in a first direction about the drive axis and a second direction about the drive axis, the second direction being opposite to the first direction. The drive link has a control end connected to the control surface mounting assembly, and a driven end connected to the drive arm via a drive bearing joint. The drive link connects the drive arm and the control surface mounting assembly such that rotation of the drive arm in the first direction about the drive axis causes the drive link to exert a retracting force on the control surface mounting assembly, and rotation of the drive arm in the second direction about the drive axis causes the drive link to exert an extending force on the control surface mounting assembly.

According to another aspect, a drive link is provided for connecting an aircraft control surface operating device driving mechanism to an aircraft control surface mounting assembly so as to translate a rotational motion of the driving mechanism to an exertion of a retracting and extending force on the aircraft control surface mounting assembly. The drive link includes a drive bearing joint, a driven end, a control end, and a drive link body. The drive bearing joint includes a substantially spherical drive bearing and is configured to be connected to the driving mechanism. The driven end is configured to be connected to the drive bearing joint such that the drive link is movable in an x-direction, a y-direction, and a z-direction relative to the driving mechanism. The control end is configured to be connected to the aircraft control surface mounting assembly. The drive link body connects the driven end and the control end.

According to still another aspect, an aircraft wing is provided with a wing body, a flap movably mounted on the wing body via a flap mounting assembly, and a flap operating device configured to move the flap relative to the wing body between a retracted position and at least one extended position. The flap operating device includes a drive arm, an actuator, and a drive link. The drive arm is mounted to the wing body so as to be rotatable about a drive axis relative to the wing body. The actuator includes a linearly displaceable actuator rod operatively connected to the drive arm such that movement of the actuator rod in a first linear direction causes the drive arm to rotate about the drive axis in a first rotational direction, and movement of the actuator rod in a second linear direction causes the drive arm to rotate about the drive axis in a second rotational direction, the second linear direction and second rotational direction being opposite to the first linear direction and first rotational direction. The drive link has a control end connected to the control surface mounting assembly, and a driven end connected to the drive arm via a drive bearing joint. The drive link connects the drive arm and the control surface mounting assembly such that rotation of the drive arm in the first direction about the drive axis causes the drive link to exert a retracting force on the control surface mounting assembly, and rotation of the drive arm in the second direction about the drive axis causes the drive link to exert an extending force on the control surface mounting assembly.

BRIEF DESCRIPTION OF THE DRAWINGS

FIG. 6 is a perspective view of a first side of the drive link.

FIG. 7 is a perspective view of a second side of the drive link.

FIG. 8(a) is a plan view illustrating the connection between the drive arm, drive link, and swing arm.

FIG. 8(b) is an expanded plan view of the connection between the drive arm, drive link, and swing arm.

DETAILED DESCRIPTION

Figure 1:
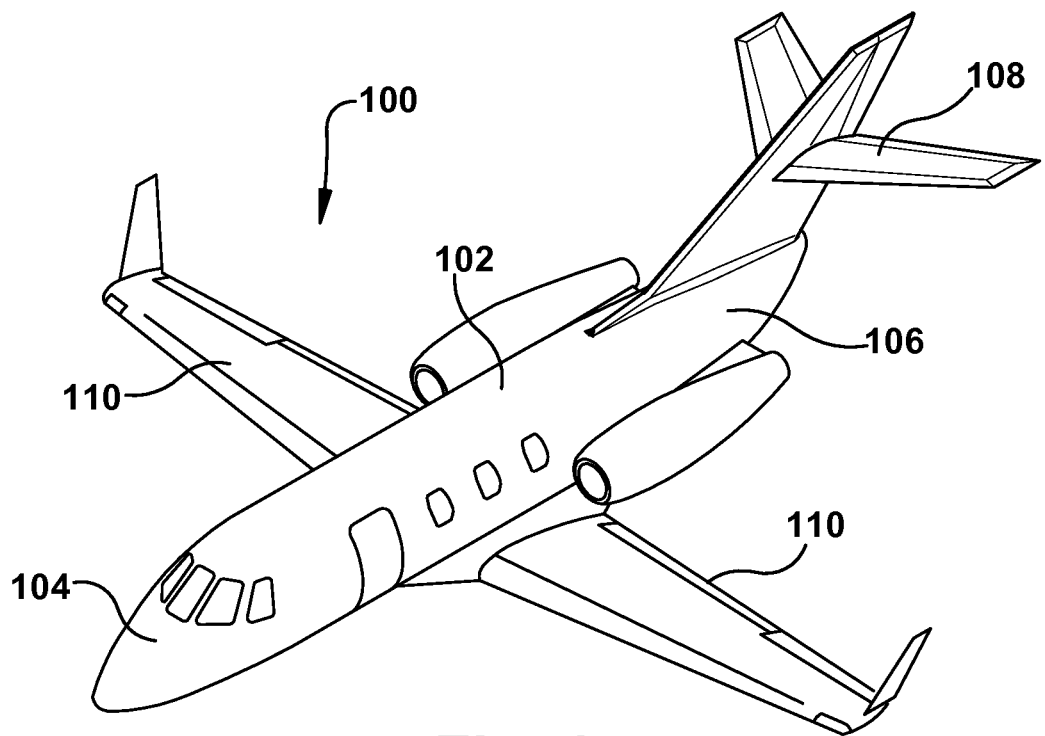
FIG. 1 is a perspective view illustrating an exemplary winged aircraft which includes a control surface and control surface operating device.

The description and drawings herein are merely illustrative and various modifications and changes can be made in the structures disclosed without departing from what is defined in the appended claims. All references to direction and position, unless otherwise indicated, refer to the orientation of the structures and components illustrated in the drawings and should not be construed as limiting the claims appended hereto. Like numbers refer to like parts throughout the several views.

FIG. 1 shows an exemplary winged aircraft 100 having a main body 102 with a nose 104 at a front end and a tail 106 at a rear end. As illustrated, the main body 102 has a substantially cylindrical shape which tapers to rounded ends at the nose 104 and tail 106. An airfoil 108 vertically projects from the tail 106, and a pair of symmetrically identical wings 110 extend in either lateral direction from a substantial midpoint of the main body 102. The aircraft 100 may include one or more control surfaces provided on any portion thereof. For example, the airfoil 108 and wings 110 may each have a control surface provided thereon. As is described in further detail below, the control surfaces are selectively movable to modify an aerodynamic profile of the aircraft by a control surface operating device.

To simplify understanding of the herein described control surface operating device, description will be limited to a single control surface, specifically a wing flap, and control surface operating device provided on one wing 110. It is to be appreciated that the control surface operating device is amenable for use on other portions of the aircraft 100, such as on the airfoil 108, and may be modified for use on those other portions and with different types of control surfaces while remaining within the scope of the instant disclosure. Furthermore, while the control surface operating device is described with reference to a control surface provided on a winged aircraft, it is also to be appreciated that the disclosed control surface operating device is amenable for use with other types of aircraft, as well as land and water vehicles.

Figure 2:
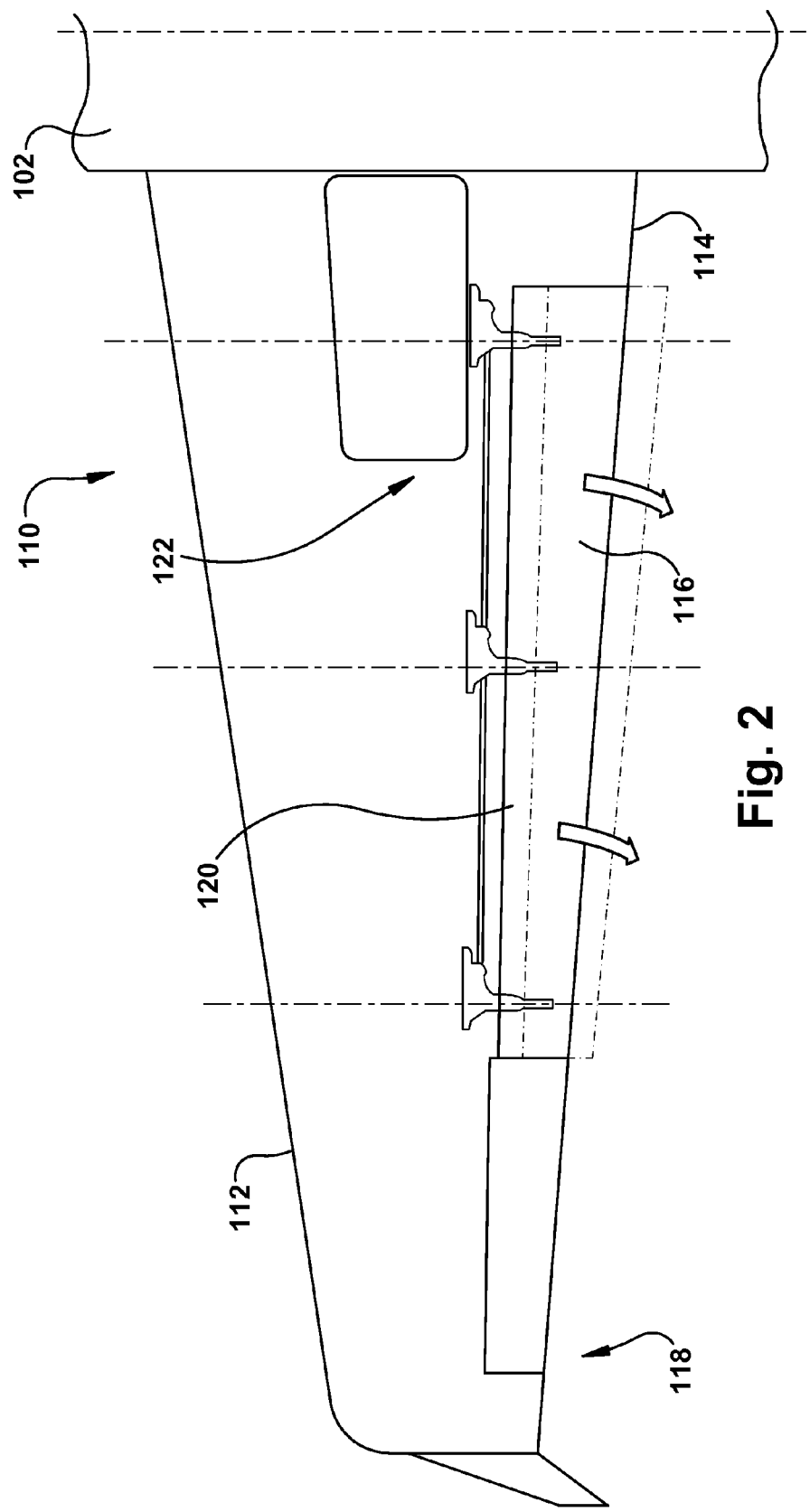
FIG. 2 is a plan view of a wing of the winged aircraft.

FIG. 2 shows the wing 110 of the aircraft 100. The illustrated wing 110 is a tapered wing having a leading edge 112 and a trailing edge 114, where a length between the leading edge 112 and trailing edge 114 at a root of the wing 110 is greater than that at a tip of the wing 110. A control surface or flap 116 is provided at a root of the trailing edge 114, and an aileron 118 is provided at a tip. The illustrated flap 116 is a double-slotted flap having a stator vane 120 positioned at an upper portion of a leading edge of the flap 116. The stator vane 120 is integrally fixed to the flap 116 such that a slot is defined between an upper surface of the wing 110 and the stator vane 120, and between the stator vane 120 and the flap 116. It is to be appreciated that the flap 116 may alternatively have a plurality of stator vanes (e.g., a triple slotted flap) or no stator vanes (e.g., a "fowler" flap).

The flap 116 is movably connected to the wing 110 via a control surface or flap operating device 122. As will be described in further detail below, the operating device 122 is provided to move the flap 116 between a retracted position, a partially extended position, and a fully extended position. It is to be appreciated that the flap operating device 122 may alternatively be configured to move the flap 116 between only two positions (e.g., fully extended and retracted), or more than three positions.

Figure 3:
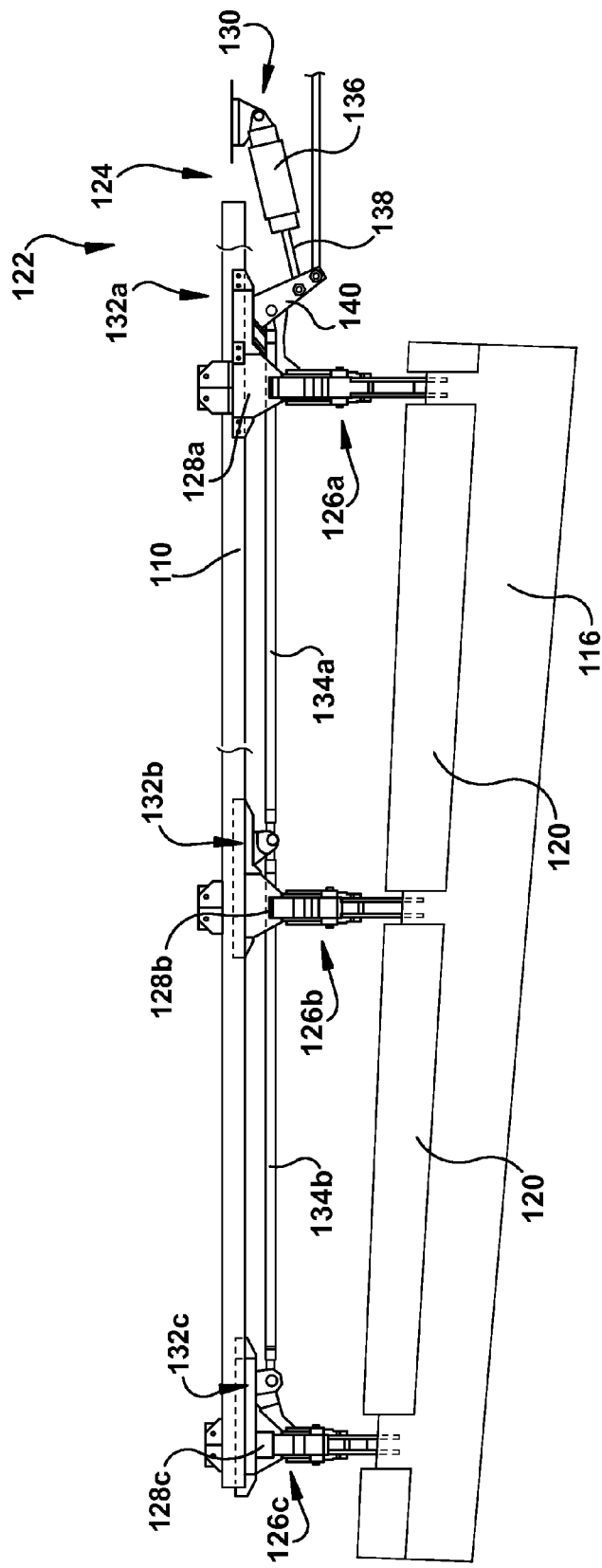
FIG. 3 is a rear view of the wing of the winged aircraft.
Figure 4:
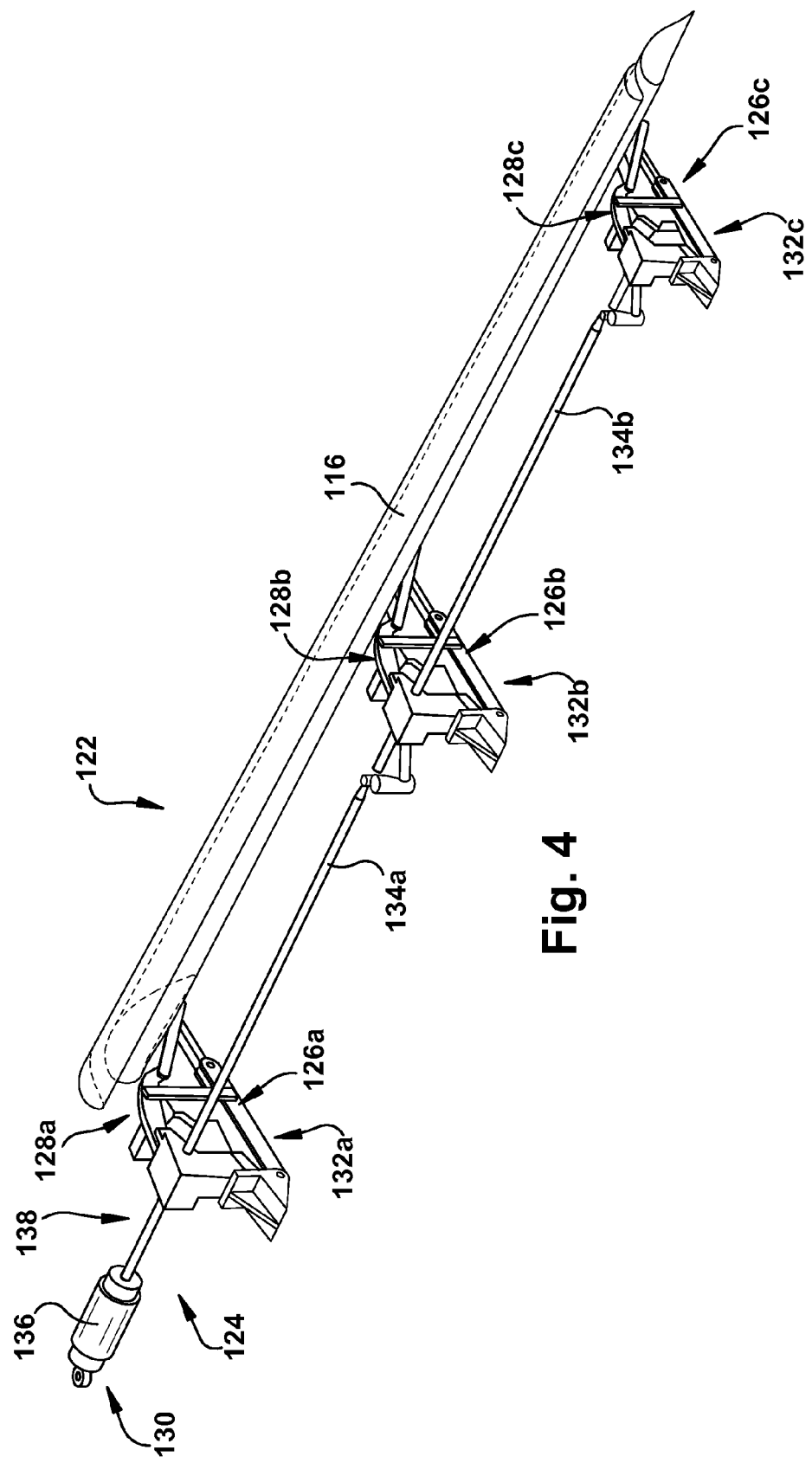
FIG. 4 is a perspective view illustrating the control surface and control surface operating device.

As shown FIGS. 3 and 4, the operating device 122 includes a driving mechanism 124, at least one drive link 126 (e.g., drive links 126a, 126b, 126c in the illustrated embodiment), and at least one flap mounting assembly 128 (e.g., innermost, intermediate, and outermost flap mounting assemblies 128a, 128b, 128c in the illustrated embodiment). Generally, the flap mounting assembly 128 movably secures the flap 116 to the wing 110 and the drive link 126 operably connects the flap mounting assembly 128 and the driving mechanism 124. The driving mechanism 124 is configured to move the drive link 126 such that the drive link 126 exerts an extending or retracting force on the flap mounting assembly 128 which causes the flap 116 to extend or retract to one of the retracted, partially extended, and fully extended positions.

The driving mechanism 124 includes an actuator 130 connected to an innermost drive arm 132a, an intermediate drive arm 132b connected to the innermost drive arm 132a via an inner actuator connecting rod 134a, and an outermost drive arm 132c connected to the intermediate drive arm 132b via an outer actuator connecting rod 134b. The actuator 130 may be a linear actuator having a base portion 136 and a linearly movable actuator rod 138 which is extendable from and retractable into the base portion 136. The actuator 130 may be a hydraulic, pneumatic, or electric actuator, or any other type of actuator capable of performing the herein described functions (including non-linear actuators).

The base portion 136 is mounted at one end to the root of the wing 110 or the aircraft main body 102, and extends toward the tip of the wing 110. The actuator rod 138 includes a proximal end held within the actuator base portion 136 and a distal end (i.e., the end nearest the tip of the wing 110) which projects from the base portion 136 toward the tip of the wing 110. The actuator rod 138 is movable in a direction toward (extending direction) and away from (retracting direction) the tip of the wing 110. The distal end of the actuator rod 138 is connected to the innermost drive arm 132a so as to exert a pushing or pulling force on the innermost drive arm 132a.

The innermost, intermediate, and outermost drive arms 132a, 132b, 132c are substantially identical to one another, and will therefore be described with reference to a single drive arm 132. It is noted that the innermost drive arm 132a is disposed at an innermost position on the wing 110, the outermost drive arm 132c at an outermost position on the wing 110, and the intermediate drive arm 132b between the innermost and outermost drive arms 132a, 132c. Other than the positioning, one difference between the intermediate and outermost drive arms 132b, 132c and the innermost drive arm 132a is that only the innermost drive arm 132a is directly connected to the actuator rod 138. This difference, and the operational relevance thereof, is described in further detail below.

Figure 5:
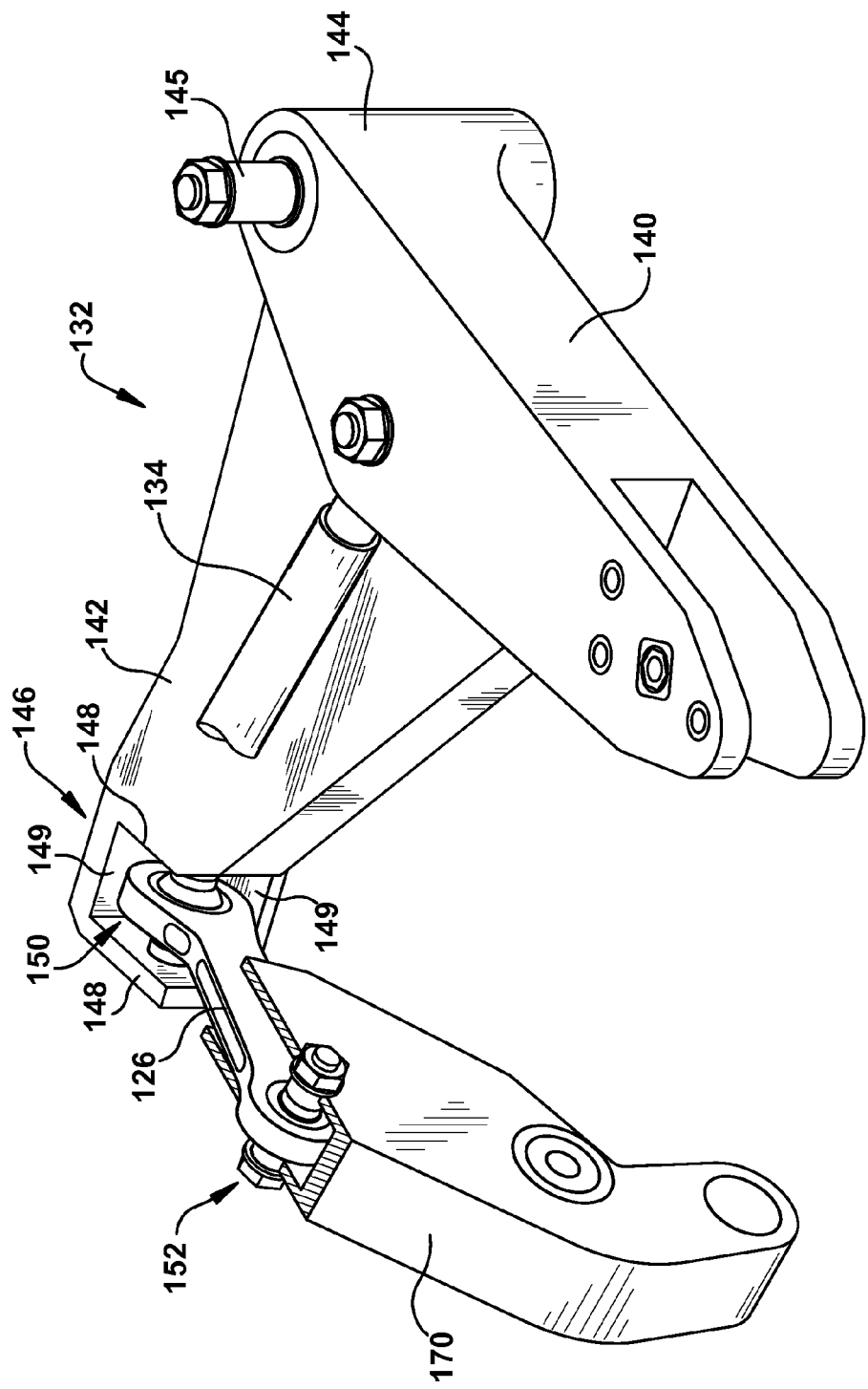
FIG. 5 is a perspective view illustrating a drive arm, drive link, and swing arm of the control surface operating device.

As shown in FIG. 5, the drive arm 132 has a first arm portion 140 and a second arm portion 142 which extend along substantially perpendicular axes from a central pivot portion 144. The central pivot portion 144 is a hollow cylindrical member configured to receive a pivot pin 145 connected to the wing 110 so that the drive arm 132 is rotatable about the pivot pin 145. The pivot pin 145 may be connected to a rear spar 164 of the wing 110. As described herein, an axis aligned with the pivot pin 145 or a center of the central pivot portion 144 is referenced as a drive axis, and the drive arm 132 is rotatable about the drive axis relative to the wing 110.

The drive arm 132 also includes a drive link connecting portion 146 provided at a distal end of the second arm portion 142, which is spaced from the central pivot portion 144. The drive link connecting portion 146 is provided by a pair of spaced surfaces 148 which project in a direction substantially parallel to the pivot pin 145, and closing surfaces 149 which extends between leading and bottom edges of the spaced surfaces 148. In this regard, the spaced surfaces 148 and the closing surfaces 149 cooperate to generally define a rectangular prism having two open surfaces and four bounded surfaces. The spaced surfaces 148 may have concentrically disposed openings defined therethrough or therein for receiving a bolt so as to connect the drive arm 132 to the drive link 126, as is described in further detail below.

The first arm portion 140 of the drive arm 132 is formed to connect to the actuator rod 138 and the inner actuator connecting rod 134a (innermost drive arm 132a), the inner actuator connecting rod 134a and the outer actuator connecting rod 134b (intermediate drive arm 132b), and/or the outer actuator connecting rod 134b (outermost drive arm 132c). Particularly, the first arm portion 140 of the innermost drive arm 132a is connected to the actuator rod 138 and inner actuator connecting rod 134a. The inner actuator connecting rod 134a extends from the first arm portion 140 of the innermost drive arm 132a and connects to the first arm portion 140 of the intermediate drive arm 132b. The first arm portion 140 of the intermediate drive arm 132b is also connected to the outer actuator connecting rod 134b. The outer actuator connecting rod 134b extends from the first arm portion 140 of the intermediate drive arm 132b and connects to the first arm portion 140 of the outermost drive arm 132c. By this configuration, the inner and outer actuator connecting rods 134a, 134b connect the innermost, intermediate, and outermost drive arms 132a, 132b, 132c such that the three drive arms 132 are movable in unison by the actuator 130. As such, the operating device 122 may operate using a single actuator 130 which is only directly connected to one drive arm 132 (i.e., the innermost drive arm 132a).

With particular regard to the operative connection of the actuator 130 and the drive arms 132, it is noted that when the actuator 130 causes the actuator rod 138 to extend (i.e., move toward the tip of the wing 110), the first arm portion 140 of the innermost drive arm 132a is pushed, which causes the innermost drive arm 132a to rotate about the drive axis in a first rotational direction such that the second arm portion 142 moves toward the rear spar 164 of the wing 110. Conversely, when the actuator 130 causes the actuator rod 138 to retract (i.e., move away from the tip of the wing 110), the first arm portion 140 of the innermost drive arm 132a is pulled, which causes the innermost drive arm 132a to rotate about the drive axis in a second rotational direction, which is opposite to the first rotational direction, such that the second arm portion 142 moves away from the rear spar 164 of the wing 110.

As the first arm portion 140 of the innermost drive arm 132a is rotated about the drive axis, the inner actuator connecting rod 134a is integrally moved and transmits the motion as a force to the intermediate drive arm 132b, thereby moving the intermediate drive arm 132b in unison with the innermost drive arm 132a. Similarly, the connection of the first arm portion 140 of the intermediate drive arm 132b and the first arm portion 140 of the outermost drive arm 132c by the outer actuator connecting rod 134b transmits the motion of the intermediate drive arm 132b as a force to the outermost drive arm 132c, thereby moving the outermost drive arm 132c in unison with the innermost and intermediate drive arms 132a, 132b.

The rotation of the drive arm 132 is transmitted to the flap mounting assembly 128 via the drive link 126. In this regard, each of the innermost, intermediate, and outermost drive arms 132a, 132b, 132c is connected to one of the innermost, intermediate, and outermost flap mounting assemblies 128a, 128b, 128c via one drive link 126a, 126b, 126c, respectively. The drive links 126a, 126b, 126c are substantially identical, and will therefore be described as with reference to a single drive link 126.

The drive link 126, shown in isolation in FIGS. 6 and 7, is an elongated, beam-type member having a driven end 150, a control end 152, and a centrally disposed body portion 154 provided between the driven end 150 and control end 152. The driven end 150 has a substantially spherical drive bearing 156 rotatably held therein, and the control end 152 has a substantially spherical control bearing 158 rotatably held therein. The control end 152 and body portion 154 are substantially linearly aligned with one another, and the driven end 150 is provided at an angle relative to the body portion 154 and control end 152. While the precise angle at which the driven end 150 is provided may vary, the drive link 126 is illustrated with the driven end 150 provided at a 20-degree angle relative to the linearly aligned control end 152 and body portion 154. This angle facilitates the connection of the drive link 126 to the drive arm 132 and the flap mounting assembly 128, as is described in further detail below. It is noted that the drive link 126 may also be formed such that the driven end 150, the control end 152, and the body portion 154 are all linearly aligned. In such a configuration, the drive arm 132 and flap mounting assembly 128 are configured for a linear or straight-line attachment.

The drive bearing 156 has a substantially spherical shape and includes connecting portions 160 provided at opposed positions on an outer surface thereof. Each of the connecting portions 160 are provided as annular members projecting from the outer surface of the drive bearing 156. An opening 157 may be defined through the drive bearing 156 so as to connect opening portions of the annular-shaped connecting portions 160. In this regard, the opening 157 may have a circular cross section with a radius corresponding to that of an inner edge of the annular connecting portions 160. Furthermore, an inner edge of the annular-shaped connecting portions 160 and/or the opening 157 extending through the drive bearing 156 may be threaded so as to threadedly engage a bolt passing therethrough.

The drive link driven end 150 has an opening defined therethrough in which the drive bearing 156 is rotatably held. As such, the drive bearing 156 may be rotated relative to the drive link driven end 150. The rotation or movement of the drive bearing 156 relative to the drive link driven end 150 is limited by the connecting portions 160, which abut on portions of the driven end 150 in the vicinity of the opening in which the drive bearing 156 is housed when the drive bearing 156 is rotated to extreme positions.

The control bearing 158 is substantially identical to the drive bearing 156. In this regard, the control bearing 158 has a substantially spherical shape and includes connecting portions 162 provided at opposed positions on an outer surface thereof. Each of the connecting portions 162 are provided as annular members projecting from the outer surface of the control bearing 158. An opening 159 may be defined through the control bearing 158 so as to connect opening portions of the annular-shaped connecting portions 162. In this regard, the opening 159 may have a circular cross section with a radius corresponding to that of an inner edge of the annular connecting portions 162. Furthermore, an inner edge of the annular-shaped connecting portions 162 and/or the opening 159 extending through the control bearing 158 may be threaded so as to threadedly engage a bolt passing therethrough.

The drive link control end 152 has an opening defined therethrough in which the control bearing 158 is rotatably held. As such, the control bearing 158 may be rotated relative to the drive link control end 152. The rotation or movement of the control bearing 158 relative to the drive link control end 152 is limited by the connecting portions 162, which abut on portions of the control end 152 in the vicinity of the opening in which the control bearing 158 is housed when the control bearing 158 is rotated to extreme positions.

The connection of the drive link 126 to the drive arm 132 is shown in FIGS. 5 and 8. The drive link driven end 150 is placed between the pair of spaced surfaces 148 provided by the drive link connecting portion 146 of the drive arm second arm portion 142. The driven end 150 is positioned such that the openings defined by the annular-shaped connecting portions 160 are aligned with the concentric openings formed in the pair of spaced surfaces 148. A mechanical fastening assembly, such as a nut and bolt assembly 161, may be used to secure the drive bearing 156 to the pair of spaced surfaces 148, thereby connecting the drive link 126 to the drive arm 132 at the drive link connecting portion 146.

When the drive bearing 156 is formed to have the opening 157 extending therethrough, the nut and bolt assembly 161 may include only a single bolt which is received in the opening 157 and secured to the spaced surfaces 148 of the drive link connecting portion 146. Alternatively, if the drive bearing 156 is not formed with the opening 157 extending therethough, the nut and bolt assembly 161 may include a pair of nut and bolt assemblies (or other mechanical fastening assemblies) may be used to secure each of the opposed connecting portions 160 to a respective adjacent one of the spaced surfaces 148. As shown in FIG. 8, the herein described drive bearing 156 has the opening 157 formed therethrough and is secured to the drive link connecting portion 146 using the nut and bolt assembly 161 having the single bolt which passes entirely through the drive bearing 156. Though not shown in the illustrated embodiments, it is further noted that the drive bearing connecting portions 160 and/or opening 157 may be threaded to threadedly engage a threaded bolt.

The drive bearing 156 may be fixedly secured to the drive link connecting portion 146 such that the drive link body portion 154 is rotatable about the relatively stationary drive bearing 156 relative to the drive arm 132. The connection of the drive bearing 156 to the drive link connecting portion 146 forms a drive bearing joint which allows the drive link to rotate in an x-direction, a y-direction, and a z-direction about the drive bearing 156 (i.e., movable in three directions). In this regard, the drive link 126 is rotatable about the drive bearing 156 at an angle relative to a connection axis of the drive bearing 156, which is an imaginary line extending between and connecting the drive bearing connecting portions 160. As shown in FIG. 8, the drive link driven end 150 is provided at a non-perpendicular angle relative to the drive bearing connection axis, and rotates about the drive bearing 156 about a rotational axis which is non-parallel to the drive bearing connection axis. Further facilitating this connection is the angled provision of the drive link drive end 150 relative to the drive link body portion 154 and control end 152.

To this point, it is noted that the drive link 126 is provided to translate rotational movement of the drive arm 132 about the drive axis into the application of a force in an extending and retracting direction of the flap 116. To accommodate this motion while minimizing stress on a connection point between the drive arm 132 and drive link 126, the drive bearing joint is provided to allow for a natural rotation of the drive link 126 about the drive bearing 156. This natural motion is facilitated by the drive link 126 rotating about an axis which is non-parallel to that of the connection axis of the drive bearing 156, as well as by providing the drive link driven end 150 at an angle relative to the drive link body portion 154 and control end 152. Particularly, the drive arm 132 and the flap mounting assembly 128 may be laterally offset from one another, and the angled driven end 150 and the ability of the drive link 126 to rotate about the drive bearing 156 at an angle relative to the connection axis of the drive bearing 156 allows for a natural rotational motion despite this lateral offset.

It is further noted that as the drive bearing 156 is rotatable relative to the driven end 150 of the drive link 126, an angle between the connection axis and the drive link body portion 154 and control end 152 may be adjusted by approximately 5-degrees in either direction. As such, though the driven end 150 is provided at the 20-degree angle relative to the control end 152 and body portion 154, the angle between the control end 152 and body portion 154 and the connection axis may be varied from the 20-degrees initially set by the driven end 150. This facilitates and eases connection of the drive link 126, particularly in systems where the positioning of the drive arm 132 and flap mounting assembly 128 may be varied, and allows the drive link 126 to rotate about the axis which is non-parallel to that of the connection axis of the drive bearing 156.

Moreover, it is noted that the lateral offset between the drive arm 132 and the flap mounting assembly 128 changes as the drive arm 132 is rotated by the actuator 130. Accordingly, the drive link 126 may rotate about the drive bearing 156 to accommodate the rotational motion of the drive arm 132. Further, as may be appreciated with reference to FIGS. 8(a) and 8(b), the angled driven end 150 of the drive link 126 allows for added lateral movement/rotation of the drive link 126 within the drive link connecting portion 146. Particularly, the drive link 126 may rotate about a wider angular range due to the angled driven end 150.

With further respect to angles at which flap operating device 122 elements interact, it is noted that a length of all linkages in the flap operating device 122 is determined based on a chord length ratio of the wing 110. A chord length is a length between the leading edge 112 and trailing edge of the wing 110, and will vary (generally reduce) as a distance from the aircraft main body 102 increases. The incorporated U.S. Pat. No. 6,464,176 describes the use of chord length ratios to set lengths for linkages of the flap operating device 122.

The flap mounting assembly 128 movably connects the flap 116 to the rear spar 164 of the wing 110. As noted above, the flap mounting assembly 128 includes the innermost flap mounting assembly 128a, the intermediate flap mounting assembly 128b, and the outermost flap mounting assembly 128c. The innermost, intermediate, and outermost flap mounting assemblies 128a, 128b, 128c are respectively associated with the innermost, intermediate, and outermost drive arms 132a, 132b, 132c. Each of the innermost, intermediate, and outermost flap mounting assemblies 128a, 128b, 128c are substantially identical to one another. As such, the description herein will be made with reference to a single flap mounting assembly, referenced as a flap mounting assembly 128.

Figure 9:
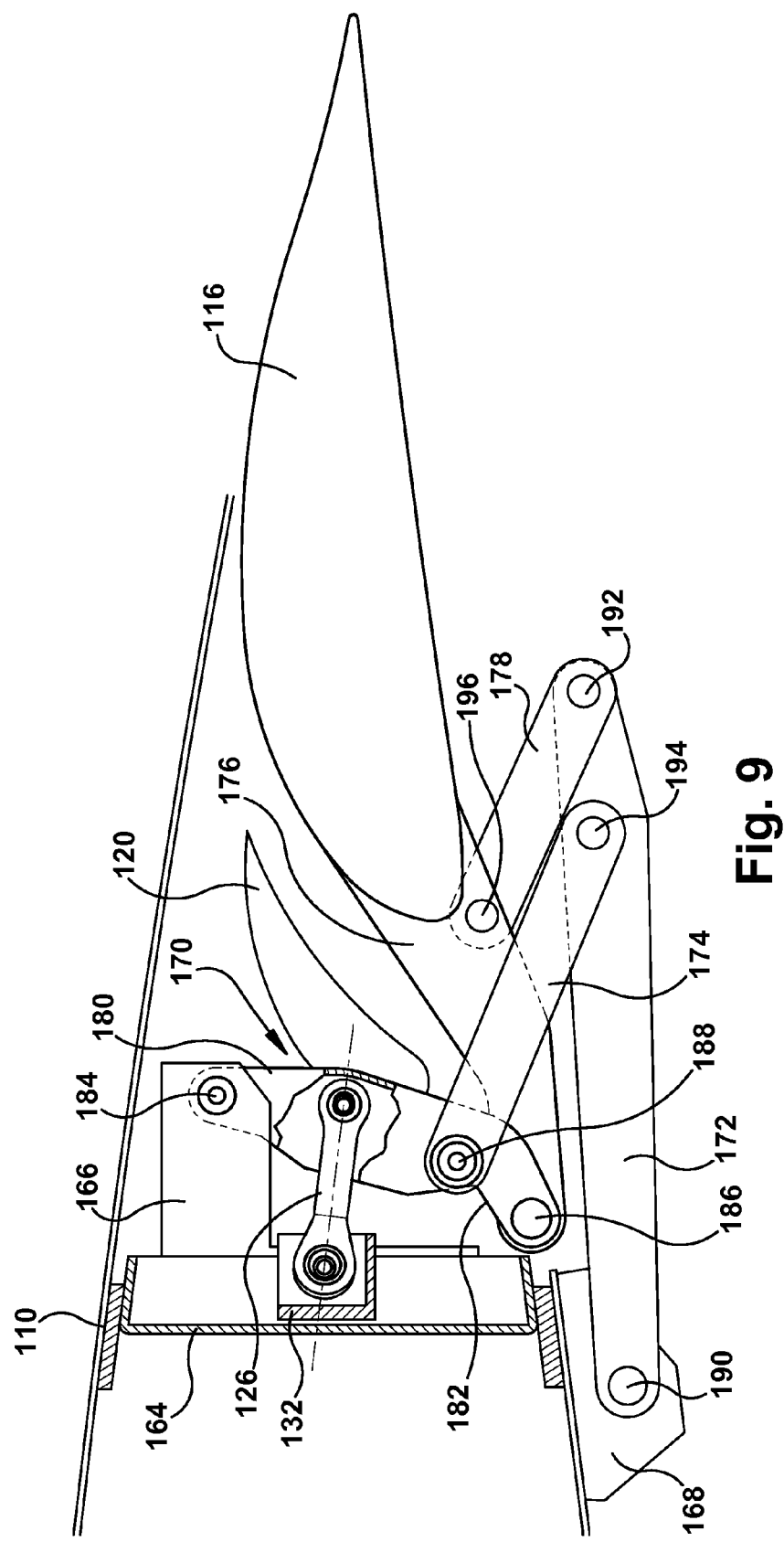
FIG. 9 is side sectional view illustrating the aircraft wing, flap and flap operating device when the flap is in a retracted position.
Figure 10:
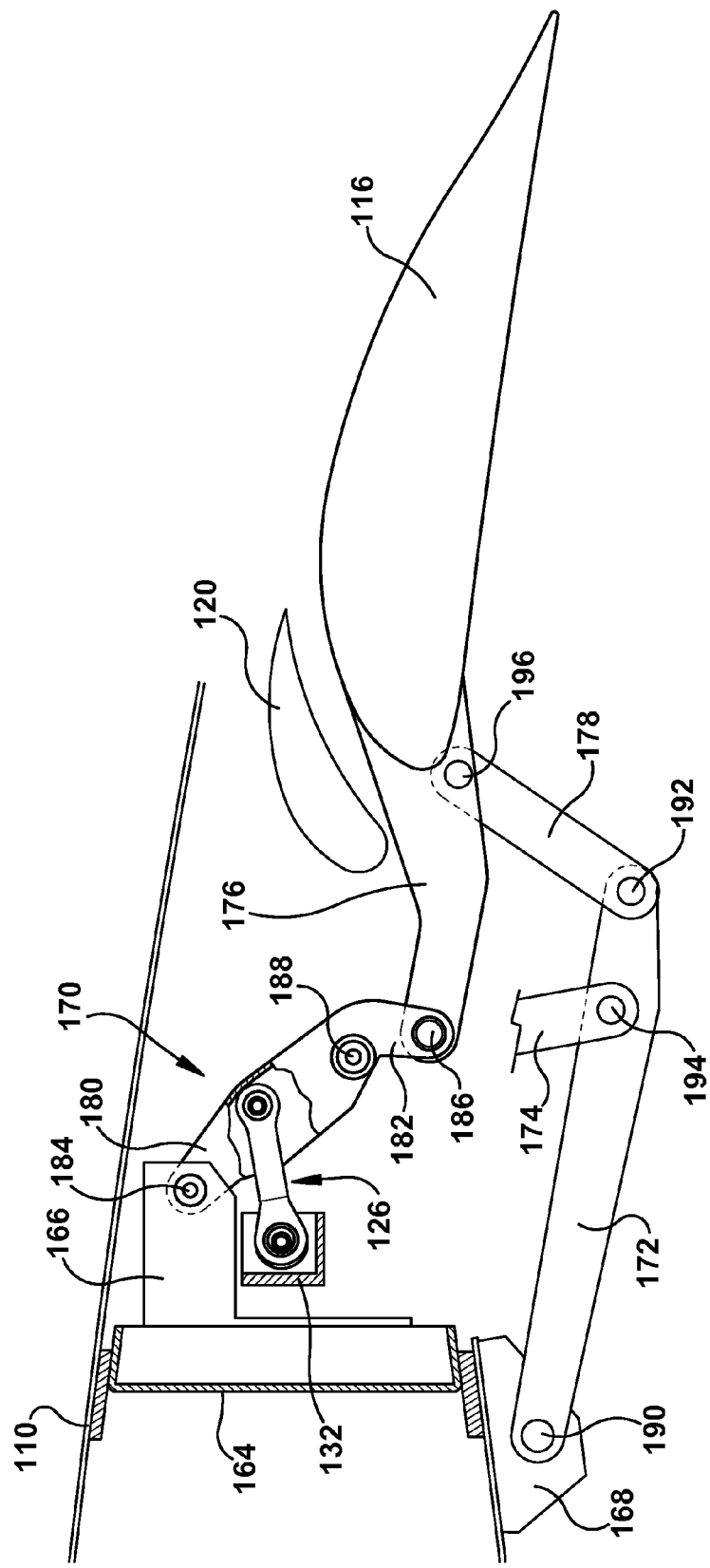
FIG. 10 is side sectional view illustrating the aircraft wing, flap and flap operating device when the flap is in a partially extended position.
Figure 11:
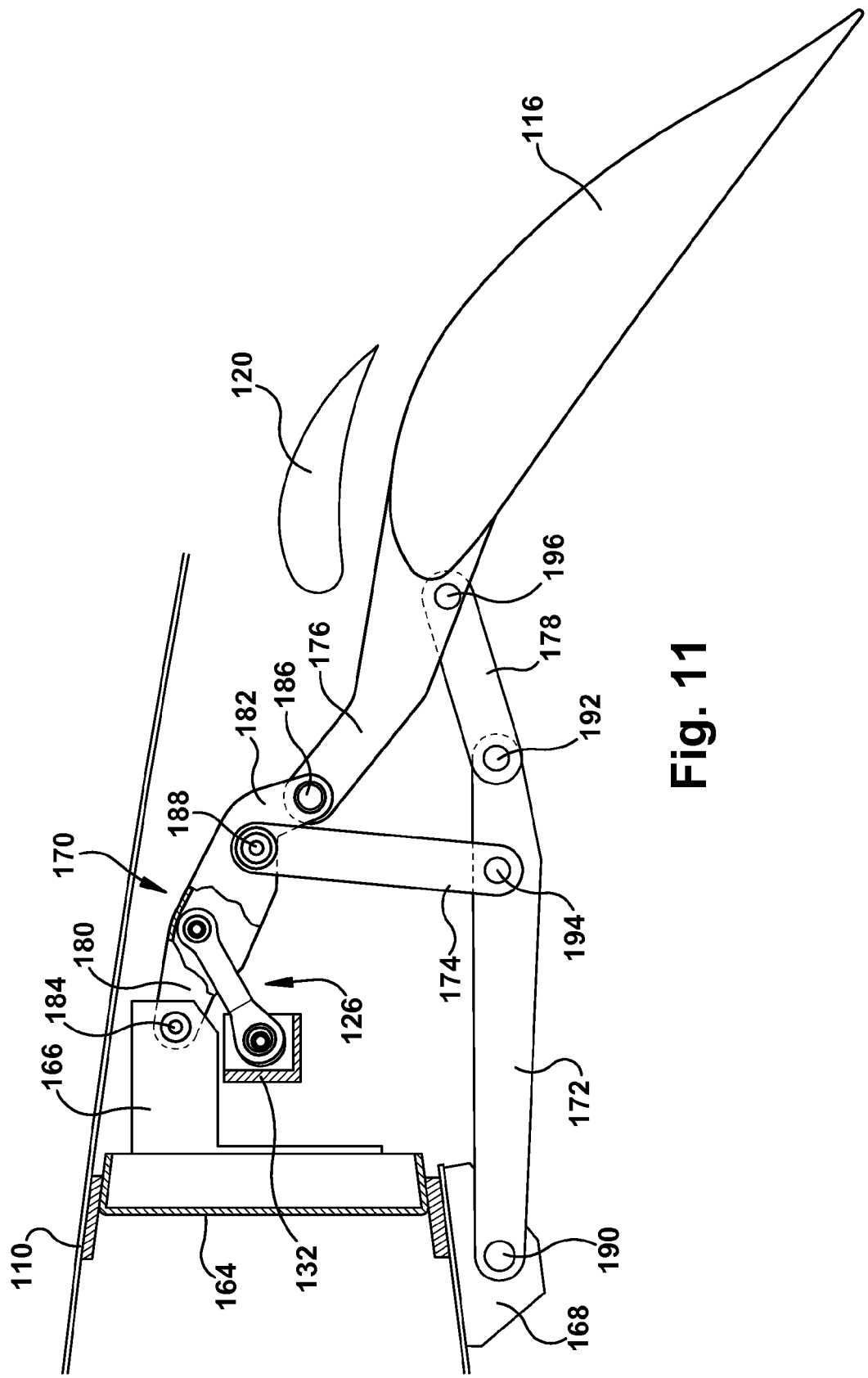
FIG. 11 is side sectional view illustrating the aircraft wing, flap and flap operating device when the flap is in a fully extended position.

As shown in FIGS. 9-11, the flap mounting assembly 128 includes a swing arm bracket 166, a carriage bracket 168, a swing arm 170, a carriage 172, a mid-link 174, a retainer or stay 176, and a support link 178. The swing arm 170 and carriage 172 are pivotally connected to the rear spar 164 of the wing 110 via the swing arm bracket 166 and carriage bracket 168, respectively, and are connected to one another via the mid-link 174. The retainer 176 is fixedly connected to the flap 116, is operatively connected to the carriage 172 via the support link 178, and is directly operatively connected to the swing arm 170. The operative connections are made such that the flap 116 is movable between the retracted position (shown in FIG. 9), the partially extended position (shown in FIG. 10), and the fully extended position (shown in FIG. 11). In this regard, the drive link 126 is connected to the swing arm 170 to exert an extending or retracting force on the swing arm 170 which causes the flap mounting assembly 128 to move the flap 116 between the retracted, partially extended, and fully extended positions.

The swing arm bracket 166 is mounted at an upper portion of a rear surface of the rear spar 164. The swing arm 170 may be a substantially U-shaped member having a first swing arm portion 180 and a second swing arm portion 182. The first and second swing arm portions 180, 182 connect at an elbow, are both substantially linear and are provided at an angle relative to one another. The swing arm 170 is pivotally connected at an end of the first swing arm portion 180 to the swing arm bracket 166 through a first swing arm pivot 184 so as to be rotatable relative to the swing arm bracket 166 about the first swing arm pivot 184. The swing arm 170 is pivotally connected at an end of the second swing arm portion 182 to a proximal end of the retainer 176 via a second swing arm pivot 186, and is connected at the elbow of the swing arm 170 to a first end of the mid-link 174 through a third swing arm pivot 188. As is described in further detail below, the swing arm 170 is operatively connected to the drive link 126 at the drive link control end 152.

The carriage bracket 168 is mounted at a lower surface of the rear spar 164. The carriage 172 is a substantially linear member which is pivotally connected at a proximal end thereof to the carriage bracket 168 via a first carriage pivot 190 so as to be rotatable relative to the carriage bracket 168 about the first carriage pivot 190. The carriage 172 is pivotally connected at distal end thereof (opposite from the proximal end) to a proximal end of the support link 178 via a second carriage pivot 192, and is connected at an intermediate portion to a second end of the mid-link 174 via a third carriage pivot 194.

The mid-link 174 is a substantially linear plate-like member which is pivotally connected at a first end thereof to the swing arm 170 via the third swing arm pivot 188, and at a second end thereof to the carriage 172 via the third carriage pivot 194. In this regard, the mid-link 174 connects the swing arm 170 to the carriage 172. It is noted that while the mid-link 174 is illustrated as being a single plate-like member, the mid-link 174 may include a pair of plate-like members connected to opposing sides of the swing arm 170 and the carriage 172.

The retainer 176 may be a plate-like member which is connected at the proximal end thereof to the swing arm 170 via the second swing arm pivot 186. At a distal end, the retainer 176 is integrated with or fixedly secured to a leading end of the flap 116 such that the flap 116 extends from the distal end of the retainer 176. Furthermore, the retainer 176 is pivotally connected to the support link 178 via a retainer pivot 196. The retainer 176 may be connected to the support link 178 at a generally intermediate position near the leading end of the flap 116, where the generally intermediate position may vary depending on various structural factors. In this regard, the support link 178, which may also be a plate-like member, connects the retainer 176 and the distal end of the carriage 172.

With respect to the first, second, and third swing arm pivots 184, 186, 188, the first, second, and third carriage pivots 190, 192, 194, and the retainer pivot 196, it is noted that these may be any members which allow for pivotal or rotatable engagement between the members connected thereby. For example, the pivots may be fulcrum pins or spherical. For example, the first and third swing arm pivots 184, 188 and the first and third carriage pivots 190, 194 may be fulcrum pins, while the second swing arm pivot 186, the second carriage pivot 192, and the retainer pivot 196 may be spherical bearings. The connection of the pivots and the associated members may be made in any suitable manner.

As noted above, the swing arm 170 is connected to the drive link 126 at the drive link control end 152. This connection is made via the control bearing 158 so as to create a control bearing joint, as shown in FIG. 8. Particularly, the first swing arm portion 180 may have a pair of concentrically aligned openings defined through opposed surfaces of the U-shaped structure. The drive link control end 152 is placed within the U-shaped structure of the swing arm 170 at the first swing arm portion 180 such that the annular-shaped connecting portions 162 are aligned with the swing arm concentric openings. A mechanical fastening assembly, such as a nut and bolt assembly 163, may be used to secure the control bearing 158 to the swing arm 170, thereby connecting the drive link 126 to the flap mounting assembly 128.

The control bearing 158 may be fixedly secured to the swing arm 170 such that the drive link body portion 154 is rotatable about the relatively stationary control bearing 158 relative to the swing arm 170. The connection of the control bearing 158 to the swing arm 170 forms the control bearing joint which allows the drive link 126 to move in an x-direction, a y-direction, and a z-direction about the control bearing 158. It is further noted that the control bearing 158 may be secured to the swing arm 170 in any of the same ways that the drive bearing 156 may be secured to the drive arm 132 (e.g., the nut and bolt assembly 163 including a threaded bolt passing through the opening 159 formed in the control bearing 158, or two nut and bolt assemblies engaging each of the control bearing connecting portions 162, etc.).

The drive link 126 is rotatable about the control bearing 158 along one axis of rotation (among three axes of rotation) which is substantially parallel to an imaginary line extending between and connecting the control bearing connecting portions 162 (i.e., a connection axis). In other words, the drive link control end 152 is provided at a substantially perpendicular angle relative to a control bearing connection axis. The perpendicular disposition of the drive link control end 152 relative to the control bearing connection axis is facilitated by the angle at which the drive link drive end 150 is provided.

It is to be appreciated that the drive link 126 may be formed to have a substantially linear or straight line shape. In such a configuration, the drive link connecting portion 146 and the swing arm 170 may be aligned to facilitate connection therebetween via the linear or straight line drive link 126. In such a configuration, the drive link 126 may rotate about the drive and control bearings 156, 158 along any of the three axes of rotation to allow for relative lateral movement between the drive arm 132 and the swing arm 170 as the drive arm 132 rotates.

Operation of the flap operating device 122 will be described with reference to FIGS. 9-11, including brief reference back to FIGS. 3 and 4, and will begin with the flap 116 in the retracted position shown in FIG. 9. The operation will be explained for the flap 116 moving from the retracted position to the partially extended position, and then to the fully extended position. However, it is to be appreciated that in actual operation the flap 116 is likely moved from the retracted position (at rest) to the partially extended position (at take-off), back to the retracted position (during flight), and then to the fully extended position (at landing). As such, it is to be appreciated that the movement between the positions may be taken in an order different than that described below.

In the retracted position, the actuator rod 138 is maximally extended from the actuator base portion 136 such that the drive arm 132 is rotated to a position where the drive arm second arm portion 142 is relatively nearest to the rear spar 164. In this position, the drive link 126 holds the swing arm 170 (particularly the first swing arm portion 180) in a substantially vertically disposed position adjacent to the rear spar 164. The retainer 176, mid-link 174, and support link 178 all pivot about their respective connections such that the flap 116 is held in a substantially horizontally oriented position (in FIG. 10) with a portion of the flap 116 disposed underneath an upper surface of the wing 110 such that the wing 110 overlaps that portion of the flap 116. The retracted position may be used during flight of the aircraft 100.

From the retracted position, the actuator 130 moves the flap 116 into the partially extended position shown in FIG. 10 by retracting the actuator rod 138 into the actuator base portion 136. As the actuator rod 138 retracts, the drive arm first arm portion 140 is pulled so as to cause the drive arm 132 to rotate in the second rotational direction. As the drive arm 132 rotates in the second rotational direction, the drive link 126 is moved in an extending direction away from the rear spar 164, thereby pressing into and exerting an extending force on the swing arm 170. The extending force acting on the swing arm 170 causes the swing arm 170 to rotate about the first swing arm pivot 184 relative to the swing arm bracket 166. Particularly, the swing arm 170 rotates such that the second swing arm portion 182 moves in a direction toward the upper surface of the wing 110 and away from the rear spar 164.

This rotation of the swing arm 170 causes the connected mid-link 174 and retainer 176 to move in the extending direction. Particularly, the mid-link 174 rotates about the third carriage pivot 194 so as to be substantially vertically oriented while pressing downward on the carriage 172 such that the carriage 172 extends from the carriage bracket 168 at a slight downward angle. The retainer 176 and integrated flap 116 are pressed and made to move in the extending direction such that the flap 116 extends from the wing 110.

In the partially extended position, the flap 116 is positioned such that a leading end of the flap 116 is roughly aligned with a trailing end of the upper surface of the wing 110. The movement, positioning and interaction of the retainer 176 and carriage 172 causes the support link 178 to rotate about the second carriage pivot 192 to hold the retainer 176 in a position generally aligned with a plane of the upper surface of the wing 110. In the partially extended position, the flap 116 is positioned to increase a lift force acting on the aircraft 100, which may be useful during take-off.

From the partially extended position, the flap 116 may be moved to a fully extended position shown in FIG. 11 by the actuator 130 moving the actuator rod 138 further in the retracting direction to a fully retracted position. This causes the drive arm 132 to further rotate in the second rotational direction about the central pivot portion 144, which moves the drive arm second arm portion 142 in the extending direction further away from the rear spar 164. Accordingly, the drive link 126 is moved further in the extending direction pressing the swing arm 170 to rotate further about the first swing arm pivot 184 relative to the swing arm bracket 166. The swing arm 170 rotates such that the first swing arm portion 180 is substantially horizontally aligned and the second swing arm portion 182 moves in the extending direction. The rotation of the swing arm 170 causes the mid-link 174 to further rotate about the third carriage pivot 194, pulling the carriage 172 to a substantially horizontal alignment. Furthermore, the swing arm 170 presses the retainer 176 in the extending direction, which causes the support link 178 to rotate about the second carriage pivot 192 so as to be substantially aligned with the carriage 172.

In the fully extended position, the flap 116 is fully extended from the wing 110 such that the leading end of the flap 116 is not overlapped with the upper surface of the wing 110. Moreover, it is noted that the retainer 176 is held at a slightly downward angle such that the flap 116 extends in the downward direction. By extending in the downward direction, the flap 116 may increase the drag on the aircraft 100, which is useful during landing. The flap mounting assembly 128 is configured such that the flap 116 moves downward while moving in the extending direction.

It is noted that in each of the retracted, partially extended, and fully extended positions, as well as during the movement therebetween, different forces are applied to the flap 116 which are transmitted to the flap mounting assembly 128, as well as the drive arm 132 and drive link 126. For example, when the flap 116 is in the fully extended position and receives an aerodynamic load, the swing arm 170 and retainer 176 receive moments about the first swing arm pivot 184 and the second swing arm pivot 186, respectively. As a result, the drive link 126 receives a compressive force, and the drive arm 132 receives a moment. It is also noted that when the aircraft 100 is on the ground, a gravitational force is applied to the flap 116 in a direction generally opposite from that of the aerodynamic load. By providing the flap operating device 122 with the herein described drive and control bearing joints which cooperate with the drive arms 132, a stiffness of the drive arms 132 (particularly at distal ends of the second arm portion 142) is increased and freeplay is reduced. The natural movement of the drive link 126 is allowed by the ability to move in the x-, y-, and z-directions about the drive and control bearings 156, 158.

With further respect to the use of the drive and control bearing joints, it is noted that these types of joints minimize complexity in assembly and maintenance as compared with other types of joints. For example, if a gimbal joint is used in place of either of the drive or control bearing joints, a tightening torque must be applied to bolts securing movable parts of the gimbal joint. The tightening torque must be appropriately set, as too high of a tightening torque may increase friction in the flap operating device, whereas too low of a tightening torque may not properly secure the movable parts of the gimbal joint and thereby cause freeplay. With the herein disclosed drive and control bearing joints, the drive and control bearings 156, 158 are fixedly secured such that some excessive tightening torque of the nut and bolt assemblies 161, 163 securing the drive and control bearings 156, 158 will not increase friction in the flap operating device 122 (e.g., slight excessive tightening torque will not substantially affect the system). Additionally, unlike other joints, bearing joints may not require or need lubricating grease, thereby easing maintenance requirements of the herein described flap operating device 122.

Moreover, the drive and control bearing joints require fewer parts and may provide a more compact structure for the flap operating device 122. By providing a more compact structure, a body of the wing 110 does not need to be reduced or truncated to accommodate the flap operating device 122. In this regard, an aircraft fuel tank may be housed in the body of the wing 110. As such, the compact structure of the flap operating device 122 allowed by the drive and control bearing joints may allow for the aircraft to have an increased fuel capacity.

Figure 12:
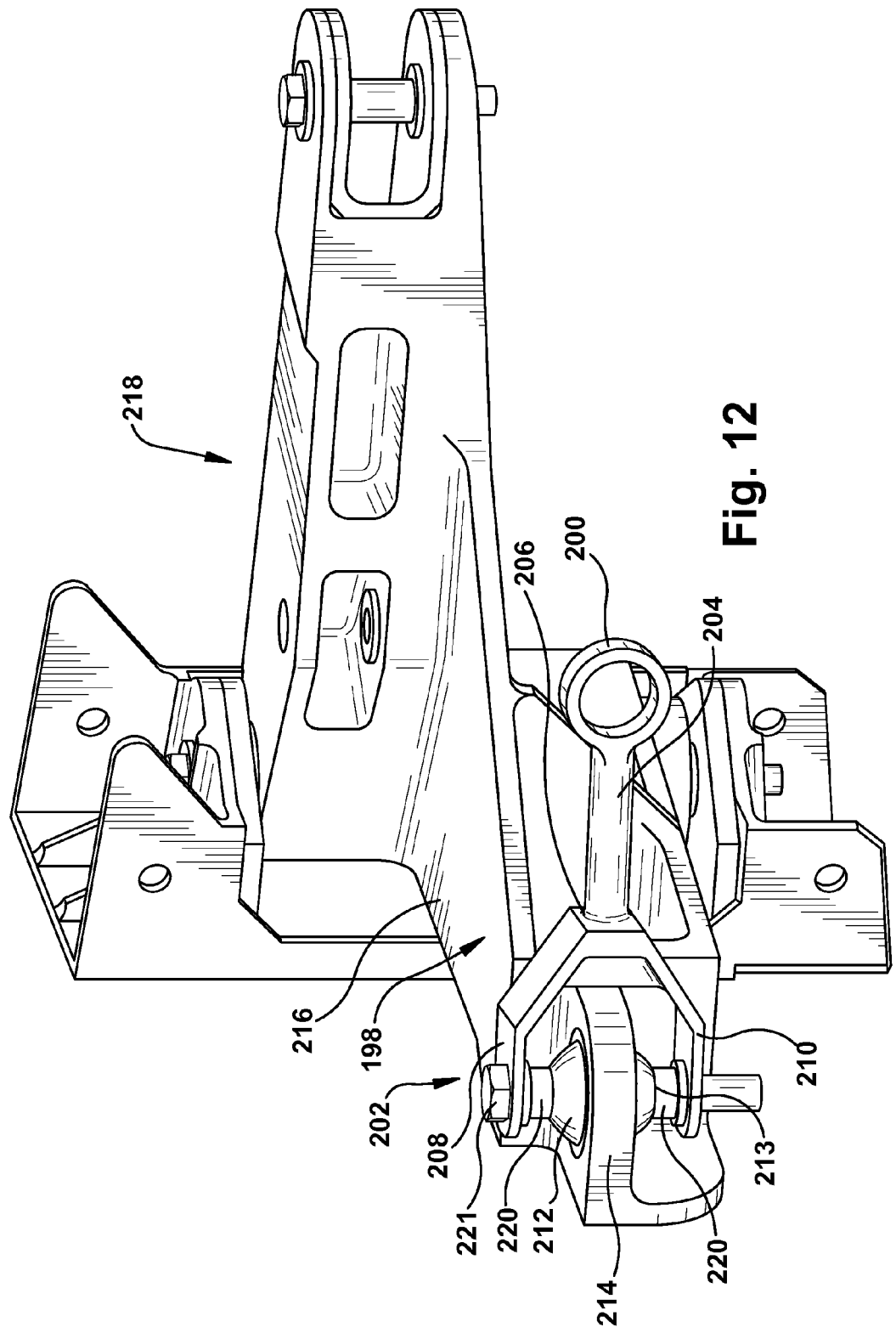
FIG. 12 is a perspective view showing an alternative drive arm and drive link.

With reference to FIG. 12, an alternative drive link 198 for use with the above-described flap operating device 122 is shown. The alternative drive link 198 includes a ring-shaped anti-rotation pad 200, a forked end 202, and a drive link rod 204 which connects the anti-rotation pad 200 to the forked end 202. The forked end 202 includes a fork base 206 from which a first fork leg 208 and a second fork leg 210 project. The first and second fork legs 208, 210 project from the fork base 206 so as to have opposing inward facing surfaces. The drive link 198 connects to the swing arm 170 by having a bolt (or other mechanical fastening assembly) pass through and engage the anti-rotation pad 200. An exemplary bolt is shown in FIGS. 5 and 8, and the connection is made by passing the bolt through the ring-shaped anti-rotation pad 200. The drive link 198 connects to the drive arm via an alternative drive bearing joint.

The drive bearing joint used with the drive link 198 includes a substantially spherical drive bearing 212 rotatably received in a horizontal leg 214 provided at a distal end of an alternative second arm portion 216 of an alternative drive arm 218. The alternative drive arm 218 is otherwise formed and mounted in an identical manner to that of the drive arm 132. The drive bearing 212 includes opposed annular connecting portions 220, and may include an opening 213 defined therethrough which connects openings of the opposed annular connecting portions 220.

A mechanical fastening assembly, such as a nut and bolt assembly 221, may be used to fixedly secure the first and second fork legs 208, 210 of the drive link 198 to the connecting portions 220. In this regard, the first and second fork legs 208, 210 may each have an opening defined through a distal end thereof, and a bolt from the nut and bolt assembly 221 may pass through these openings and the opening 213 formed through the drive bearing 212. Alternatively, the nut and bolt assembly 221 may include a pair of nut and bolt assemblies used to fixedly secure each of the first and second fork legs 208, 210 to one of the opposed connecting portions 220. It is noted that in this assembly, the drive link 198 is fixedly secured to the drive bearing 212 to form a drive bearing joint, and the drive bearing 212 is rotatable within its housing in the drive arm 218. It is also noted that the drive link 198 is movable in an x-direction, a y-direction, and a z-direction about the drive bearing 212 relative to the drive arm 218. As such, the alternative drive link 198 provides similar benefits to the flap operating device 122 as those provided by the drive link 126.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An aircraft control surface operating device for operating a control surface provided on an aircraft body portion to move between a retracted position and at least one extended position, the aircraft control surface operating device comprising:
   a control surface mounting assembly configured to movably secure the control surface to the aircraft body portion;
   a drive arm rotatably mounted to an aircraft body portion so as to be rotatable about a drive axis relative to said aircraft body portion;
   an actuator configured to rotate the drive arm in a first direction about the drive axis and a second direction about the drive axis, the second direction being opposite to the first direction; and
   a drive link having a control end connected to the control surface mounting assembly via a control bearing joint, and a driven end connected to the drive arm via a drive bearing joint,
   wherein
   the drive bearing joint includes a substantially spherical drive bearing rotatably held within an opening defined through the drive link at the driven end, the drive bearing including a pair of drive bearing connecting portions provided opposite to one another on a surface of the drive bearing, the drive bearing being fixedly connected to the drive arm at the drive bearing connecting portions such that the drive link is rotatable about the drive bearing relative to the drive arm,
   the control bearing joint includes a substantially spherical control bearing rotatably held within an opening defined through the drive link at the control end, the control bearing including a pair of control bearing connecting portions provided opposite to one another on a surface of the control bearing, the control bearing being fixedly connected to the control surface mounting assembly at the control bearing connecting portions such that the drive link is rotatable about the control bearing relative to the control surface mounting assembly,
   an axis of rotation of the drive link about the drive bearing is nonparallel to an imaginary line connecting the drive bearing connecting portions, and an axis of rotation of the drive link about the control bearing is parallel to an imaginary line connecting the control bearing connecting portions, and
   the drive link connects the drive arm and the control surface mounting assembly such that rotation of the drive arm in the first direction about the drive axis causes the drive link to exert a retracting force on the control surface mounting assembly, and rotation of the drive arm in the second direction about the drive axis causes the drive link to exert an extending force on the control surface mounting assembly.

2. The aircraft control surface operating device according to claim 1, wherein
   the drive link includes an extended body portion disposed between the driven end and control end,
   the opening defined through the drive link at the driven end in which the drive bearing is received passes entirely through the drive link at the driven end between a first surface of the drive link at the driven end and a second surface of the drive link at the driven end, the opening defined through the drive link at the control end in which the control bearing is received passes entirely through the drive link at the control end between the first surface of the drive link at the control end and the second surface of the drive link at the control end, the drive link control end and body are substantially linearly aligned with one another, and the drive link driven end is provided at an angle relative to the drive link body and control end such that a driven end imaginary line is non-parallel with a control end imaginary line, the driven end imaginary line passing through the drive opening and oriented perpendicularly to the first surface and the second surface of the drive link at the driven end, and the control end imaginary line passing through the control opening and oriented perpendicularly to the first surface and the second surface of the drive link at the control end.

3. A drive link for connecting an aircraft control surface operating device driving mechanism to an aircraft control surface mounting assembly so as to translate a rotational motion of the driving mechanism to an exertion of a retracting and extending force on the aircraft control surface mounting assembly, the drive link comprising:

a drive bearing joint including a substantially spherical drive bearing, the drive bearing joint configured to be connected to the driving mechanism;

a driven end connected to the drive bearing joint such that the drive link is movable in an x-direction, a y-direction, and a z-direction relative to the driving mechanism;

a control bearing joint including a substantially spherical control bearing, the control bearing joint configured to be connected to the aircraft control surface mounting assembly;

a control end connected to the control bearing joint such that the drive link is movable in the x-direction, the y-direction, and the z-direction relative to the aircraft control surface mounting assembly; and a drive link body connecting the driven end and the control end, wherein the drive bearing joint is integrated in the driven end with the drive bearing rotatably received in a drive opening defined entirely through the driven end, the drive opening extending between a first surface of the drive link and a second surface of the drive link at the driven end, the control bearing joint is integrated in the control end with the control bearing rotatably received in a control opening defined entirely through the control end, the control opening extending between the first surface of the drive link and the second surface of the drive link at the control end, and the drive link body and control end are substantially linearly aligned with one another, and the driven end is provided at an angle relative to the drive link body and control end such that a driven end imaginary line is non-parallel with a control end imaginary line, the driven end imaginary line passing through the drive opening and oriented perpendicularly to the first surface and the second surface of the drive link at the driven end, and the control end imaginary line passing through the control opening and oriented perpendicularly to the first surface and the second surface of the drive link at the control end.

4. The drive link according to claim 3, wherein the drive bearing further comprises at least one connecting portion configured to fixedly connect the drive bearing to the driving mechanism.

5. The drive link according to claim 4,
wherein the control bearing further comprises at least one connecting portion configured to fixedly connect the control bearing to the aircraft control surface mounting assembly.

6. An aircraft wing comprising a wing body, a flap movably mounted on the wing body via a flap mounting assembly, and a flap operating device configured to move the flap relative to the wing body between a retracted position and at least one extended position, the flap operating device comprising:

a drive arm mounted to the wing body so as to be rotatable about a drive axis relative to the wing body;

an actuator including a linearly displaceable actuator rod operatively connected to the drive arm such that movement of the actuator rod in a first linear direction causes the drive arm to rotate about the drive axis in a first rotational direction, and movement of the actuator rod in a second linear direction causes the drive arm to rotate about the drive axis in a second rotational direction, the second linear direction and second rotational direction being opposite to the first linear direction and first rotational direction, respectively; and a drive link having a control end connected to the control surface mounting assembly via a control bearing joint, and a driven end connected to the drive arm via a drive bearing joint, wherein the drive bearing joint includes a substantially spherical drive bearing rotatably held within an opening defined entirely through the drive link at the driven end, the drive opening extending between a first surface of the drive link at the driven end and a second surface of the drive link at the driven end, the control bearing joint includes a substantially spherical control bearing rotatably held within an opening defined entirely through the drive link at the control end, the control opening extending between a first surface of the drive link at the control end and a second surface of the drive link at the control end, the driven end is provided at an angle relative to the control end such that a driven end imaginary line is non-parallel with a control end imaginary line, the driven end imaginary line passing through the drive opening and oriented perpendicularly to the first surface and the second surface of the drive link at the driven end, and the control end imaginary line passing through the control opening and oriented perpendicularly to the first surface and the second surface of the drive link at the control end, and the drive link connects the drive arm and the control surface mounting assembly such that rotation of the drive arm in the first direction about the drive axis causes the drive link to exert a retracting force on the control surface mounting assembly, and rotation of the drive arm in the second direction about the drive axis causes the drive link to exert an extending force on the control surface mounting assembly.

7. The aircraft wing according to claim 6, wherein the drive bearing includes a pair of drive bearing connecting portions provided opposite to one another on a surface of the drive bearing, the drive bearing being fixedly connected to the drive arm at the drive bearing connecting portions such that the drive link is rotatable about the drive bearing relative to the drive arm, the control bearing includes a pair of control bearing connecting portions provided opposite to one another on a surface of the control bearing, the control bearing being fixedly connected to the control surface mounting assembly at the control bearing connecting portions such that the drive link is rotatable about the control bearing relative to the control surface mounting assembly, and an axis of rotation of the drive link about the drive bearing is nonparallel to an imaginary line connecting the drive bearing connecting portions, and an axis of rotation of the drive link about the control bearing is parallel to an imaginary line connecting the control bearing connecting portions.

\* \* \* \* \*